United States Patent [19]

Kenny et al.

[11] Patent Number: 4,918,972
[45] Date of Patent: Apr. 24, 1990

[54] DUAL REFERENCE TRACK SCHEME

[75] Inventors: Philip Kenny, Los Altos; Dan Cautis, San Mateo; John Bizjak, San Jose, all of Calif.

[73] Assignee: Brier Technology, Inc., San Jose, Calif..

[21] Appl. No.: 269,585

[22] Filed: Nov. 10, 1988

[51] Int. Cl.$^5$ .............................................. G01B 21/10
[52] U.S. Cl. .................................... 73/1 R; 360/77.04
[58] Field of Search ........... 73/1 R; 360/77.01, 77.04, 360/77.12-77.14

[56] References Cited

U.S. PATENT DOCUMENTS

| | | | |
|---|---|---|---|
| 4,027,338 | 5/1977 | Kril | 360/77.08 |
| 4,371,960 | 2/1983 | Kroiss | 360/77.04 |
| 4,701,815 | 10/1987 | Yada et al. | 360/77.06 |

Primary Examiner—Stewart J. Levy
Assistant Examiner—Robert R. Raevis
Attorney, Agent, or Firm—Hecker & Harriman

[57] ABSTRACT

A method and apparatus for performing adaptive calibration of a disk drive assembly and for determining an offset value to compensate for differences in servo head to data head distance from a nominal value. The present invention has particular application in a relative track count servo system where absolute track position is not known from a reading of the servo track itself. In the preferred embodiment, a single head assembly having both a data head and a servo head is utilized. The distance between the data head center and the servo head center must be known so that a disk written on one drive assembly can be read in another drive assembly. This distance is a nominal value but may vary due to manufacturing tolerances. In the present invention, both the data and servo heads are utilized to establish a servo anchor reference track and to determine an offset correction value to compensate for variations in the servo/data head spacing. A dual reference track architecture is employed on the disk surface. The data head is positioned over the first reference track and centered to within a desired accuracy. Once the data head is in place, the servo track beneath the servo head is established as the anchor reference servo track. The heads are then moved across the disk until the data head is positioned over the center of the second reference track. During this movement, the servo tracks are counted to determine the number of servo tracks between the first reference track and the second reference track. This count is then compared to a table storing the number of servo tracks crossed when the data/servo head distance corresponds to the nominal value. The difference in the actual number of tracks crossed and the stored value is used to generate an offset value to compensate for data/servo head distance variations during seeks and other positioning operations.

7 Claims, 2 Drawing Sheets

DUAL REFERENCE TRACK SCHEME

BACKGROUND OF THE INVENTION

1. Field of the Invention

This invention relates to the field of information storage systems.

2. Background Art

Mass storage for computer or other information systems is typically provided by magnetic media storage systems such as rigid or flexible disk storage systems. A rotating disk having a magnetic media layer on the surface is accessed by a "read/write" head which is used to store and retrieve information from the disk surface. To store information on a magnetic media disk, flux reversals are induced in the magnetic particles comprising the surface. When a magnetic read/write head is passed over the flux reversals, a signal is induced in the head which can be decoded to provide information.

Typically, data is stored on a magnetic disk in series of concentric "tracks" on the surface of the disk. The read/write head moves back and forth radially on the disk so that it can be selectively positioned over one of the tracks. Once in position over a track, the head remains in place as the track rotates beneath it allowing the head to read or write data on the track.

To effectively read and write data, it is necessary that the position of the tracks with respect to the head be known. In addition to knowing which track a head is over, it is necessary to know where on that particular track the head is positioned. In the prior art, position information is provided through the use of servo patterns. A servo pattern is a permanent pattern written onto a storage disk which can be used to provide position information. The servo pattern is detected by a servo head and, by properly decoding the servo pattern, signifies track position. The servo pattern is typically also written as a series of concentric tracks. In a multi-disk storage environment, one entire side of a storage disk may be dedicated to servo information. A servo head accesses this servo disk to read the position information therein. Since the servo head is in a fixed relationship relative to the read/write heads, the position of the servo head can be used to indicate the position of the read/write heads. In addition to having a dedicated surface for servo information, a "sector" servo pattern may be employed in which pie shaped wedges of servo information are interleaved between sections of data information.

In order to improve the efficiency of data storage in magnetic disk systems, it is desired to maximize the data storage capability. Any disk surface area which is dedicated to servo tracks cannot be used for data tracks. One method of freeing up space for data tracks is to "bury" the servo layer beneath the surface of the data disk itself. One such scheme is described in pending U.S. patent application No. 07/116,109 entitled SERVO PATTERN and assigned to the assignee of the present invention. In that scheme, a plurality of servo lines are formed on a data disk extending from the inner track to the outer track. These lines are employed as part of a buried servo scheme such that the disk surface is dedicated to data storage. The servo pattern is written on each side of the disk so that, if the disk were transparent, the respective servo lines would appear to intersect when viewed from above. Servo heads located on each side of the disk detect servo line crossings. By comparing the time difference between crossings of corresponding tracks on either side of the disk, the radial position of the heads can be determined and servo and data tracks can be defined.

Typically, a separate data and servo head are utilized in the disk drive assembly. In one implementation, the data head and servo head are part of a dual core assembly where one core serves as the data head and the other serves as the servo head. The relationship between these two heads must be known to enable a disk drive to read disks written on other disk drive assemblies. For example, if the distance between the servo head and data head on one dual core assembly is one servo track width greater than the separation of the two heads on a second drive, a one track error will be introduced when a disk written on the first drive is read on the second drive. Servo track spacings are on the order of hundreds of micro-inches so small variations in the servo/data head spacing may result in errors of several servo track widths.

These variations are usually detected and compensated for on power up of the drive assembly. An adaptive calibration procedure is implemented to compare the relative servo and data head positions to a stored nominal value. For example, when the data head is located over the first data track, the servo head may be positioned over servo track "n" when the servo/data head spacing is nominal. When this spacing is off, the servo head is positioned over servo track $n \pm m$ where m is the number of tracks offset introduced by variations in the servo/data head spacing.

This adaptive calibration scheme is effective only if the absolute position of a servo track is known. Such a requirement implies the use of periodic missing bits in the servo pattern. The reliable detection of pulses in a waveform containing missing bits requires peak detection via a differentiation network. This imposes severe constrains on the type of filter which may be used to remove noise coming from the data head when it is writing. It is often desirable to provide a servo pattern in which peak detection is not required, however, in such a scheme, absolute servo track position is not known.

Therefore, it is not possible to utilize the prior art adaptive calibration scheme above to calibrate the drive and determine spacing between the data heads and the servo head. Such spacing must be known, particularly if a disk written on one drive is desired to be utilized on another drive. Typically, manufacturing tolerances result in differences in the spacing between the data head and servo head on dual head assemblies.

In many prior art disk drives which utilize servo tracks for closed loop track following, the spacing between servo tracks is uniform and is equal to the data track spacing. In these drives, it is only necessary to locate data track #0 as a reference point. In these drives, data track #0 serves as a "reference track" and only one reference point is needed.

In some prior art servo schemes, such as that disclosed is copending patent application number 07/116,109 entitled SERVO PATTERN and assigned to the assignee of the present invention, the servo tracks are nonuniformly spaced. The distance between servo tracks, in inches, continuously decreases when moving from the outer radius of the disk to the inner radius. A second difference is that the location of each servo track is defined solely in the time domain. As a consequence, interpolating between servo tracks is remarkably easy. All that is needed is a clock which is higher in frequency than the frequency of the servo pulses.

In some implementations of a nonuniformly spaced servo pattern, the servo track coordinates of each data track are stored in a lookup table in ROM (Read Only Memory). In such a case the table stored in ROM is only valid for recording heads in which the spacing between the two heads in any particular drive is equal to a nominal value. If not, a nonlinear correction factor must be used to calculate the actual servo track corresponding to each data track for that drive.

Therefore, it is an object of the present invention to provide a method and apparatus for determining the difference from a nominal data head/servo head spacing in a disk drive assembly.

It is another object of the present invention to provide a method and apparatus for calibrating a disk drive assembly so that a disk written on one drive may be accessed by another drive.

It is yet another object of the present invention to provide a method and apparatus for calibrating a disk drive assembly without requiring a "missing bit" servo pattern.

It is still another object of the present invention to provide a method and apparatus for calibrating a disk drive assembly wherein no peak detection of the servo pattern is required.

SUMMARY OF THE PRESENT INFORMATION

The present invention provides a method and apparatus for performing adaptive calibration of a disk drive assembly and for determining an offset value to compensate for differences in servo head to data head distance from a nominal value. The present invention has particular application in a relative track count servo system where absolute track position is not known from a reading of the servo track itself. In such a scheme, an anchor track must be defined and servo track position information is determined relative to the anchor track so that data head position may be established. In the preferred embodiment, a single head assembly having both a data head and a servo head is utilized. The distance between the data head center and the servo head center must be known as that a disk written on one drive assembly can be read in another drive assembly. This distance is a nominal value but may vary due to manufacturing tolerances.

In the present invention, both the data and servo heads are utilized to establish a servo anchor track and to determine an offset correction value in inches to compensate for variations in the servo/data head spacing. A dual reference track architecture is employed on the disk surface. The data head is positioned over the first reference track and centered to within a desired accuracy. For example, in one embodiment of the present invention, the head is positioned to within plus or minus 10 micro-inches. Once the data head is in place, the servo track beneath the servo head and a fractional part thereof is established as the servo anchor track. The heads are then moved across the disk until the data head is positioned over the center of the second reference track. During this movement, the servo tracks are counted to determine the number of servo tracks (both the integer and fractional part) between the first reference track and the second reference track. This count is then compared to a table storing the number of tracks when the data/servo head distance corresponds to the nominal value. The difference in the actual number of tracks crossed and the stored value is used to generate an offset value in inches to compensate for data/servo head distance variations during seeks and other positioning operations. The two reference tracks must be in known locations in inches in this embodiment. The dual reference track scheme of the present invention permits a single frequency servo pattern to be implemented. This allows for simple zero crossing detection and eliminates the need for a peak detector arrangement in the servo detect circuitry.

The servo track spacing in the preferred embodiment is very repeatable and predictable. A manufacturing tool known as a servowriter places both the servo pattern and two reference tracks on each disk. The servo patterns are written at very precise locations ($+/-10$ microinches). The two reference tracks are also written at radii whose absolute location is not known, but whose difference is known. If the spacing between the servo head and the data head were known in the servowriter, the exact radius of each reference track could be established. The distance separating the two reference tracks must be controlled and known. Suppose that a disk which has been servowritten as described is placed in a drive which has a data head to servo head spacing smaller than that in the servowriter. Let the data head in the drive be positioned over the outer reference track. The servo head in the drive will then be positioned at a greater radius than it was in the servowriter. This corresponds to location where the servo tracks are less dense than they were in the servowriter. Now move the data head until it is over the inner reference track and count the servo track crossings on the way. The servo head will again be at a larger radial distance from the center than it was in the servowriter. This also corresponds to a position in which the servo tracks are less dense than they were in the servowriter. It follows then that fewer servo tracks were crossed in the drive as the data head moved from the outer to the inner reference track than would have been crossed in the servowriter. From this difference in servo track counts, the difference in spacing in inches of the data head to the servo head between the drive and the servowriter may be calculated.

DETAILED DESCRIPTION OF THE PRESENT INVENTION

A method and apparatus for performing adaptive calibration of a disk drive assembly and for determining an offset value to compensate for differences in servo head to data head distance from a nominal value is described. In the following description, numerous specific details, such as nominal servo/data head distance, number of servo tracks between reference tracks, etc., are described in order to provide a more thorough description of the present invention. It will be apparent, however, to one skilled in the art, that the present invention may be practiced without these specific details. In other instances, well known features have not been described in detail in order to obscure the present invention.

The present invention is advantageously employed when a dual core head assembly is utilized. However, whenever the difference in spacing from a nominal value between a servo head and a data head must be known, the present invention has equal application, particularly when absolute servo track position information is not available. The present invention is described, by way of example only, in connection with the servo scheme described in U.S. patent application No. 07/116,109. However, the present invention is not limited to such a servo pattern scheme but may be employed in a variety of servo applications.

In the present example, a data storage disk includes a plurality of first servo lines buried on one surface of a disk beneath a data layer. A second plurality of servo lines are buried on the second surface of the disk beneath a second data layer. The servo lines are logarithmic spirals extending from an inner radius of the disk to an outer radius. The servo lines converge toward the inner radius. By utilizing a logarithmic spiral shape for the servo lines, the servo lines will intersect a radial line of the disk at a constant angle anywhere along the servo line. Thus, a servo head at the end of an actuator arm assembly and moving in a radial line on the disk will intersect the servo line at the same angle at each point of the servo line. This allows for maximum signal detection by the servo head at all radial positions.

Because the servo lines are disposed at an angle to the concentric data tracks, cross talk between the data and servo tracks is minimized. As the angle between a read head and an information track becomes greater, the amount of signal detection lessens until a point is reached, the "azimuth" angle, at which minimum detection occurs. By maximizing the angle between the servo lines and the data tracks, the azimuth effect is maximized, reducing unwanted interference and cross talk between the two tracks. The present invention utilizes a time based detection scheme in which the servo tracks are independent of the data tracks. Thus, a relatively large servo head may be utilized, allowing for easier detection of buried servo.

Figure 1:
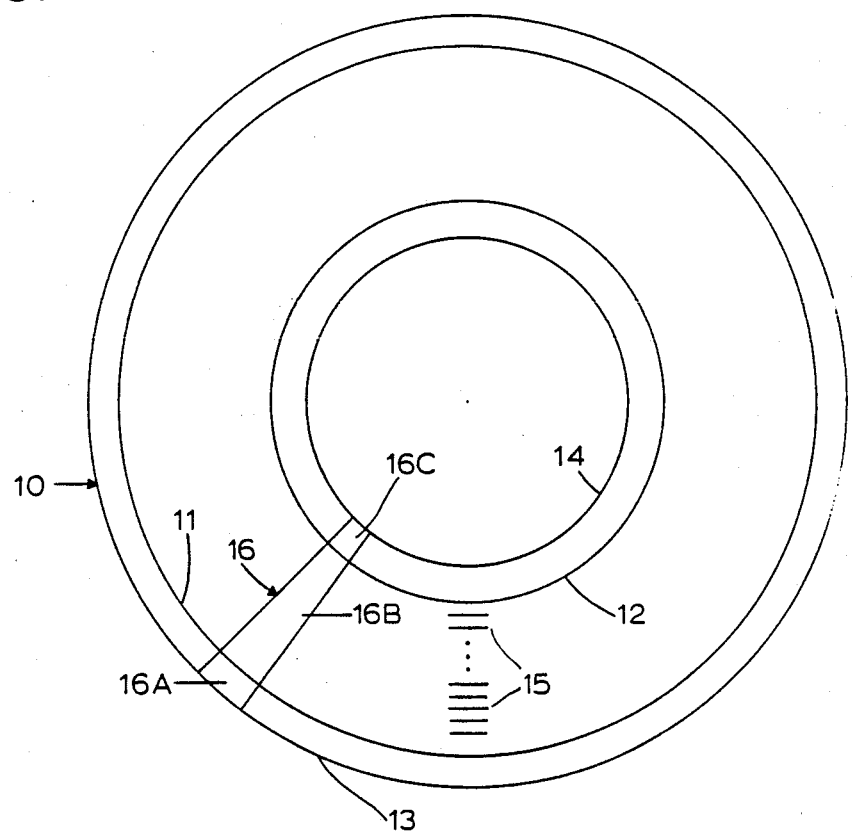
FIG. 1 is a top view of a servo disk employing the preferred embodiment of the present invention.

In the preferred embodiment of the present invention, the adaptive calibration scheme is utilized with a flexible magnetic media. However, it would be apparent, to one skilled in the art, that the present invention has equal application to magnetic tape drives and to other rotating media storage systems such as Winchester hard disk drives, magneto-optical and optical drives A top view of a disk utilizing the preferred embodiment of the present invention is illustrated in FIG. 1. FIG. 1 illustrates a storage disk 10 having an outer radius 13 and inner radius 14. A first reference track 11 is formed near the outer radius 13 of the disk 10. A second reference track 12 is formed near the inner radius 14 of the disk 10. The first and second reference tracks 11 and 12 are ready by a data head. A plurality of servo tracks 15 are formed on the disk. In the preferred embodiment of the present invention, the servo tracks are formed as part of a buried layer scheme in which data tracks are written on the surface of disk 10 and servo tracks are written beneath the surface of the disk 10. A plurality of data tracks may be formed between first and second reference tracks 11 and 12 for storing and retrieving of information. Access and location of these data tracks are controlled by the servo tracks 15.

In positioning the servo head over a servo track, the corresponding data track may be identified.

Figure 2:
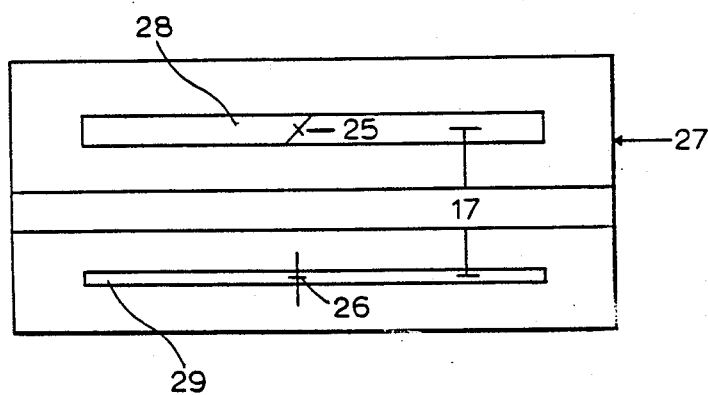
FIG. 2 is a bottom view of a dual core data/servo head.

A view of a dual core data/servo head is illustrated in FIG. 2. The dual core head 27 includes a servo head 28 and a data head 29. The servo head 28 includes a gap 25. Data head 29 includes gap 26. Servo gap 25 is at an angle of approximately 45 degrees of data gap 26. As noted previously, this angle, due to the azimuth effect, reduces the amount of cross talk between the data and servo layers. In the configuration shown, the servo gap length 25 is approximately 4 times as large as the data gap length 26. In prior art servo schemes, the width of the servo head gap approximates that of the data head gap because the servo tracks are coincident with the data tracks. In the present example, where the servo pattern is independent of track pitch, the size of the servo gap width is independent of the size of the data gap width. This permits the use of a relatively large servo gap, making it easier to detect the buried servo layer in the preferred embodiment of the present invention. Further, large gap heads are less expensive to produce than thin gap heads, thus reducing the cost of a servo head using the configuration of FIG. 2.

The servo head 25 and data head 26 are separated by a distance 17. The nominal value of this distance in the preferred embodiment is approximately 60 mils. This distance is given by way of example only, and nominal discharge having other values are contemplated in the present invention. When the absolute servo track position is not known, it is necessary for the deviation from this nominal distance to be known to allow drive to drive transferability of disks.

Because the servo pattern of the present example is time based, it is not necessary for the servo head to detect a unique servo signal for each data track. The time based scheme of the present invention is a "presence/absence" scheme so that a large servo signal may be used, improving the signal to noise ratio over conventional servo schemes.

Although a single dual core head is illustrated in FIG. 2, the present invention has equal application in any situation where there is a fixed and nominal relationship between a servo head and a data head, and deviations in that relationship must be determined for accurate storing and retrieving of information. The invention has particular application where absolute servo position is not available from the servo tracks. Further, in the dual core scheme of FIG. 2, the data and servo head are at angles to each other. This relationships is not a requirement of the present invention but serves as an example only. A dual core head in which the servo head and data head have some other angular relationship is contemplated by the present invention as well.

Referring again to FIG. 1, the first and second reference tracks 11 and 12 are written onto the disk 10 at known locations in terms of servo tracks coordinates (as opposed to absolute inches). That is, the first reference track 11 is always written at servo track n and the second track 12 is written at servo track n+s. In operation, the data head is positioned over the centerline of one of the reference tracks (e.g. reference track 11). The servo track beneath the servo head at that time is designated as servo track zero, or as the anchor servo track. The data head is then moved to a position over the centerline of the second reference track (e.g. reference track 12). During this movement, the number of servo tracks crossed during the move is counted. This count is then compared to a stored value representing the number of servo tracks expected when the distance 17 between servo head gap centerline 25 and data head gap centerline 26 is equal to the nominal distance.

If the number of servo tracks counted varies from the stored number, an offset correction signal is generated to compensate for the variations in nominal distance. The basic equation for determining the radial position of a particular servo track in a logrithmically spaced pattern is:

$$R_T = R_Z e^{-(\frac{\pi N_T}{N_S}) \cot \alpha}$$ Equation 1 or $$R_T = R_Z e^{-K N_T}$$

Where
$R_T$ = the radial location in inches of the servo track in question.
$R_Z$ = the location of servo track zero.
$N_S$ = the number of servo flux transitions per revolution.
$\alpha$ = the angle of the servo head.
$K = (\pi / N_S) (\cot \alpha)$
$N_t$ = the servo track number of the servo track in question.
$\pi = 3.1415926...$ The relative difference between any two servo tracks ($n_2$ and $n_1$) is denoted by $\Delta S$. Therefore:

$$\Delta S = N_2 - N_1 = \frac{1}{K} \left[ \ln \left( \frac{R_Z}{R_2} \right) - \ln \left( \frac{R_Z}{R_1} \right) \right]$$ Equation 2

$$\Delta S = \frac{1}{K} \ln \left( \frac{R_1}{R_{21}} \right)$$

$$R_1 > R_2$$

Let $\Delta S_1$ to be the nominal difference in relative servo tracks of the location of the two reference tracks and let $\Delta S_2$ be the difference in relative servo tracks of the locations of the two reference tracks when read in a given drive. Assuming that the difference in data head to servo head spacing from the nominal is represented by $\Delta^2 S$ then:

$$\Delta^2 S = \Delta S_1 - \Delta S_2$$ Equation 3

$$\Delta^2 S = \frac{1}{K} \left[ \ln \left( \frac{R_1}{R_2} \right) - \ln \left( \frac{R_1 + \epsilon}{R_2 + \epsilon} \right) \right]$$

Where: $\epsilon$ = actual radial deviation in inches of the data head to servo head spacing from it's nominal value. Thus, the variations in the track count correspond to variations in data/servo head spacing. It is possible to take advantage of this relationship to compensate for spacing variations.

Table 1 was generated by using Equation 3 letting our $R_1 = 1.54482$ inches and our $R_2 = 0.88043$ inches. This shows representative values for values of $\Delta^2 S$ ranging for values of $\epsilon$ from $-0.003$ inches to $+0.003$ inches.

TABLE 1

| $\epsilon$ (inches) | $\Delta^2 S$ (servo tracks) |
| --- | --- |
| −0.003 | −6.062 |

TABLE 1-continued

| $\epsilon$ (inches) | $\Delta^2 S$ (servo tracks) |
| --- | --- |
| −0.002 | −4.037 |
| −0.001 | −2.017 |
| 0 | 0 |
| 0.001 | 2.013 |
| 0.002 | 4.023 |
| 0.003 | 6.029 |

Figure 3:
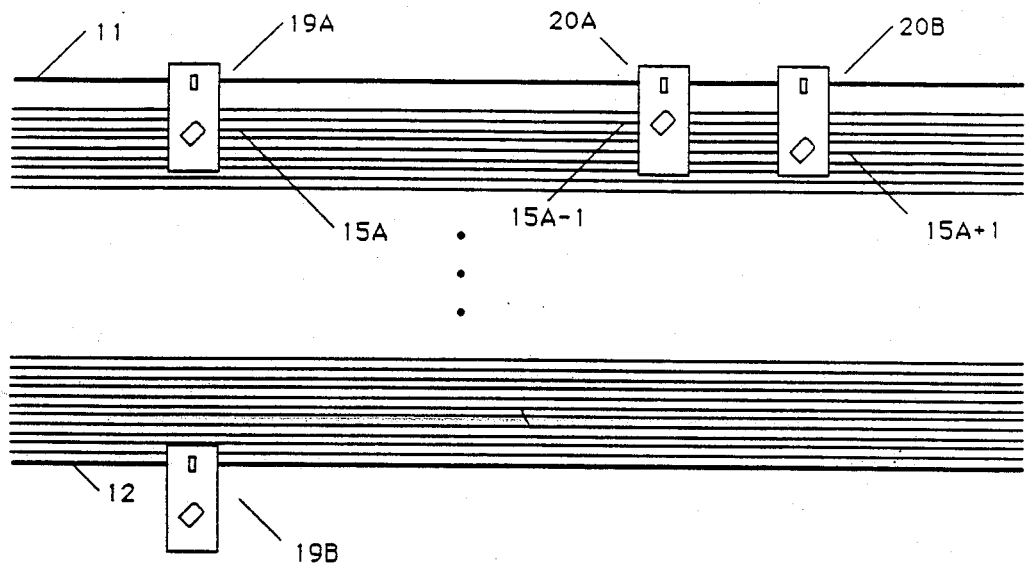
FIG. 3 is an expanded view of a section of a disk illustrating the operation of the present invention.

The operation of the present invention is illustrated in FIG. 3. In FIG. 3, the servo track spacing is not drawn to scale. In the preferred embodiment of the present invention, the spacing is logrithmic. However, the present application may be utilized with other non-regular servo patterns. On power up of the drive, or whenever a calibration is required, the data head is positioned over the outer reference track 11 as shown at position 19A. The reference track 11 is written as a series of alternate bursts. The amplitudes of the left and right signals of the read channel of the data head are sampled and compared. When the amplitudes match, the data head is positioned over the centerline of the reference track 11.

Once the data head is positioned over the centerline of the referece track 11, the servo head is accessed. The servo track 15A below the servo head when the data head is in position is defined as servo track "0". The relative servo track counters are then reset to zero.

Next, the data head is moved to the centerline of the second reference track 12 at position 19B. During this "seek", the relative servo track counters are incremented for each sero track crossed. When the data head is positioned over the centerline of the second reference track 12, the count of the track counters is sampled and substituted as $\Delta S_2$ in Equation 3. The nominal track count is $\Delta S_2$ in Equation 3. The nominal track count is $\Delta S_1$ and $\Delta^2 S$ can be easily found.

As shown at position 20A, when the data to servo head spacing is less than nominal, the number of servo tracks crossed is less than when the spacing is nominal. When the data/servo head spacing is greater, (position 20B), the number of servo tracks crossed while moving the data head from the first reference track to the second reference track is greater than the nominal.

The locating and centering of the data head over the centerline of the first and second reference tracks is performed by using the track following circuitry of the data head as a "seek" engine. Referring to FIG. 1, radial location information 16 is written on the disk for use by the data head. This location field has three zones to provide relative radial location information to the data head during positioning. The data head is moved to the reference track centerline in a two stage process. In a first "coarse" stage, the data head reads information from the location field to locate a relatively position with respect to the reference tracks. The section 16A of the location field 16 contains a unique pattern indicating that the data head is outside of reference track 11. Section 16B contains a pattern indicating that the data head is between the two reference tracks. Section 16C contains information indicating that the data head is inside of the inner reference track 12. The data head utilizes this coarse relative location information to converge on the reference track. In the preferred embodiment of the present invention, this coarse locating stage has a resolution of plus or minus 1000 micro-inches.

After the data head is on the reference track, an amplitude comparison scheme is used as a fine position mode to locate the data head over the centerline of the reference track. That is, the amplitude of the signal bursts on the left and right channels is sampled and the position of the head is adjusted until the amplitudes match. The fine positioning stage has a resolution of plus or minus 10 micro-inches in the preferred embodiment of the present invention.

After the offset is determined, a correction factor is used to compensate for the variation in servo/data head spacing. In the preferred embodiment of the present invention, the value $\Delta^2 S$ is used to calculate the correction value. For example, if a seek command is made to the drive, a look up table is used to direct the servo head to a servo track corresponding to the desired data track. However, this look up table is based on a nominal data/servo head spacing. Therefore, the $\Delta^2 S$ value is used to correct the servo track number (corresponding to the desired data track number) by an amount which depends on how much the offset between data and servo head differs from the nominal spacing.

Figure 4:
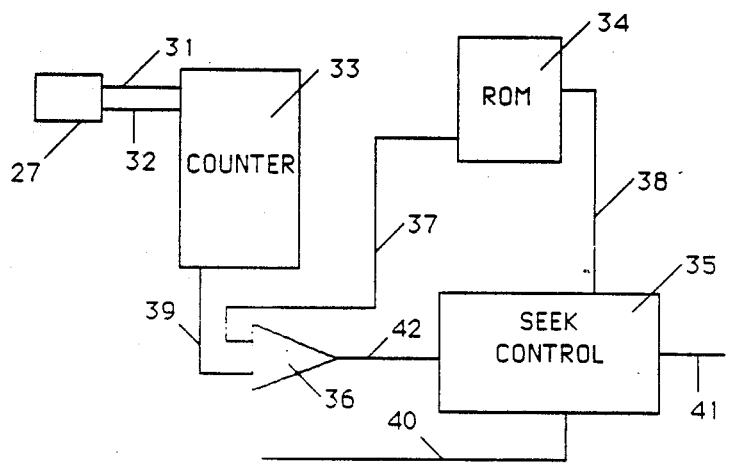
FIG. 4 is a block diagram of a portion of the read circuitry of the present invention.

A block diagram illustrating the read circuitry of the present invention is illustrated in FIG. 4. The dual core data/servo head 27 of the present invention outputs data and servo signals 31 and 32 respectively to counter 33. When the head assembly 27 is positioned over the first reference track, the counter 33 is reset to 0. When the head 27 is moved to the second reference track, the counter is incremented for each servo track (or portion of servo track) crossed during the move. The counter 33 outputs a signal on line 39 representing a number of servo tracks crossed between the first and second reference track. This count is compared to value representing the number of tracks crossed when the servo/data head spacing is at the nominal distance. This number is stored in lookup ROM 34 and is provided on line 37 to the input of comparator 36. The output of comparator 36 is provided to seek a control means 35 which may be an onboard microprocessor, for example. The output 42 of comparator 36 is used an offset value to correct a seek command based on the variation in space data/servo head spacing. When a seek command 40 is inputed to the seek control means 35, the seek control accesses the ROM 34 on line 38 to determine which servo track to seek to. The signal 42 is utilized to correct this value so that the seek is compensated for the variations in servo/data head spacing. The output 41 of seek control means 35 may be a signal to the actuator assembly to move the head 27 to the correct servo track.

Thus, a method for determining and adjusting for variations in data/servo head spacing is described.

We claim:
1. A method for calibrating a servo head and a data head having a fixed relationship with each other, said method comprising the steps of:
 providing a plurality of servo tracks on a storage media;
 providing a first reference track on said storage media;
 providing a second reference track on said storage media;
 defining an anchor servo track as a servo track beneath said servo head when said data head is positioned over said first reference track;
 generating a servo track count by counting servo tracks crossed by said servo head when said data head is moved from said first reference track to said second reference track;
 comparing said servo track count to a stored track count, said stored track count representing the number of servo tracks crossed when a distance between said servo head and said data head is a nominal value;
 generating a first error signal by taking the difference between said servo track count and said stored track count, said difference proportional to a difference in separation between said servo head and said data head from said nominal value.

2. The method of claim 1 wherein said servo head and said data head are part of a dual core assembly.

3. The method of claim 1 wherein said storage media comprises a rotating disk.

4. The method of claim 1 wherein said difference in track count and said difference in said servo to data head spacing are related by:

$$\Delta^2 S = \Delta S_1 - \Delta S_2$$

$$\Delta^2 S = \frac{1}{K} \left[ \ln\left(\frac{R_1}{R_2}\right) - \ln\left(\frac{R_1 + \Delta}{R_2 + \Delta}\right) \right]$$

where:
 $\Delta$ = the actual deviation in data head to servo head spacing from said nominal value;
 $\Delta S_1$ = said stored track count;
 $\Delta S_2$ = said servo track count;
 $R_1$ = the radial position of said first reference track;
 $R_2$ = the radial position of said second reference track;
 $K = (\pi/N_S)(\cot \alpha)$;
 $N_S$ = the number of flux transitions per revolution; and
 $\alpha$ = the angle of said servo head.

5. In a rotating media storage system having a data head and a servo head having a fixed relationship to each other and a plurality of servo tracks formed on a surface of said rotating media, a method for determining a variation in separation between said data head and said servo head from a nominal value comprising the steps of:
 defining a first reference track on said surface;
 defining a second reference track on said surface;
 positioning said data head over said first reference track;
 moving said data head from said first reference track to said second reference track;
 counting servo tracks crossed when said data head is moved to generate a servo track count;
 subtracting said servo track count from a stored track count to generate a difference value, said stored track count representing the number of tracks crossed when said separation of said data and said servo head is equal to said nominal value;
 using said difference value to determine the difference in the actual separation between said data head and said servo head.

6. The method of claim 5 wherein said data head and said servo head comprise a dual core assembly.

7. The method of claim 5 wherein said difference value is generated by:

$$\Delta^2 S = \Delta S_1 - \Delta S_2$$

-continued $$\Delta^2 S = \frac{1}{K}\left[\ln\left(\frac{R_1}{R_2}\right) - \ln\left(\frac{R_1+\epsilon}{R_2+\epsilon}\right)\right]$$

where:
$\epsilon$ = the actual deviation in data head to servo head spacing from said nominal value;
$\Delta S_1$ = said stored track count;
$\Delta S_2$ = said servo track count;
$R_1$ = the radial position of said first reference track;
$R_2$ = the radial position of said second reference track;
$K = (\pi/N_S)(\cot \alpha)$;
$N_S$ = the number of flux transitions per revolution; and
$\alpha$ = the angle of said servo head.

* * * * *